United States Patent [19]

LeBlanc

[11] 3,764,157

[45] Oct. 9, 1973

[54] ROUGH TERRAIN PACK VEHICLE

[76] Inventor: Edward A. LeBlanc, Star Rt., Box 1-A, Mesilla Park, N. Mex. 88047

[22] Filed: Jan. 12, 1972

[21] Appl. No.: 217,339

[52] U.S. Cl. .............................. 280/124 B, 267/58
[51] Int. Cl. ............................................. B60g 11/14
[58] Field of Search .............................. 267/58, 11; 280/124 B

[56] References Cited
UNITED STATES PATENTS

| | | | |
|---|---|---|---|
| 3,241,855 | 3/1966 | Kersey | 280/124 B X |
| 2,724,589 | 11/1955 | Misic | 267/58 |
| 2,738,203 | 3/1956 | Misic | 267/58 |
| 2,455,787 | 12/1948 | Linn | 267/58 |
| 558,003 | 4/1896 | Steeck | 296/6 |

Primary Examiner—Philip Goodman
Attorney—Harvey B. Jacobson

[57] ABSTRACT

A two-wheeled vehicle including opposite side wheels journaled from the free end portions of forwardly and rearwardly directed crank arms carried by the opposite end portions of a transverse axle journaled from the vehicle frame. The axle is oscillatable relative to the supporting portions of the vehicle frame, the crank arms are mounted stationarily relative to the axle and opposing adjustable torsion springs are connected between the vehicle axle supporting portions and the opposite ends of the axle for yieldingly biasing the axle in opposite directions of rotation thereby urging the axle to a center position of rotation with one of the crank arms projecting horizontally forwardly and the other crank arm projecting horizontally rearwardly.

11 Claims, 5 Drawing Figures

ROUGH TERRAIN PACK VEHICLE

The vehicle of the instant invention is designed to be hand-propelled, or possibly towed behind a suitable tractive vehicle, and includes a wheel-supporting structure, or other ground-engaging support structure, enabling inverse up-and-down movement of the opposite side ground-engaging support structures relative to the body of the vehicle. This type of suspension enables the vehicle to move over rough terrain and across slopes while the body of the vehicle is maintained generally horizontal. Further, spring means is operatively connected between the body of the vehicle and the opposite side ground-engaging support structures yieldingly biasing these support structures toward intermediate positions of their up-and-down movement in order that any tendency of the body of the vehicle to tilt toward one side or the other relative to the support wheels will be resisted and the aforementioned spring means is adjustable in order to inversely vary the vertically shifted positions of the opposite side support structures toward which the wheels are yieldingly biased. Accordingly, the vehicle may be utilized to traverse a wide slope with the body of the vehicle yieldingly biased toward a generally horizontal position.

It is believed that the vehicle of the instant invention will be extremely useful to hunters desiring to carry large animals out of the wilds and also to rescue teams who may wish to carry injured persons over rough terrain.

The main object of this invention is to provide a two-wheeled vehicle that may be utilized to carry a selected load over rough terrain with the opposite side wheels of the vehicle mounted in such a manner to enable those wheels to readily move over various types of ground obstructions encountered.

Another object of this invention, in accordance with the immediately preceding object, is to provide a two-wheeled load-carrying vehicle that may be readily manually propelled by one person or by two persons disposed at opposite ends of the vehicle.

Still another object of this invention is to provide a pack vehicle in accordance with the preceding objects and constructed in a manner whereby it may be towed behind a tractive vehicle.

Another important object of this invention is to provide a vehicle in accordance with the preceding objects whose ground-engaging support wheels may be readily replaced by other types of support assemblies such as snow skis.

A final object of this invention to be specifically enumerated herein is to provide a pack vehicle in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
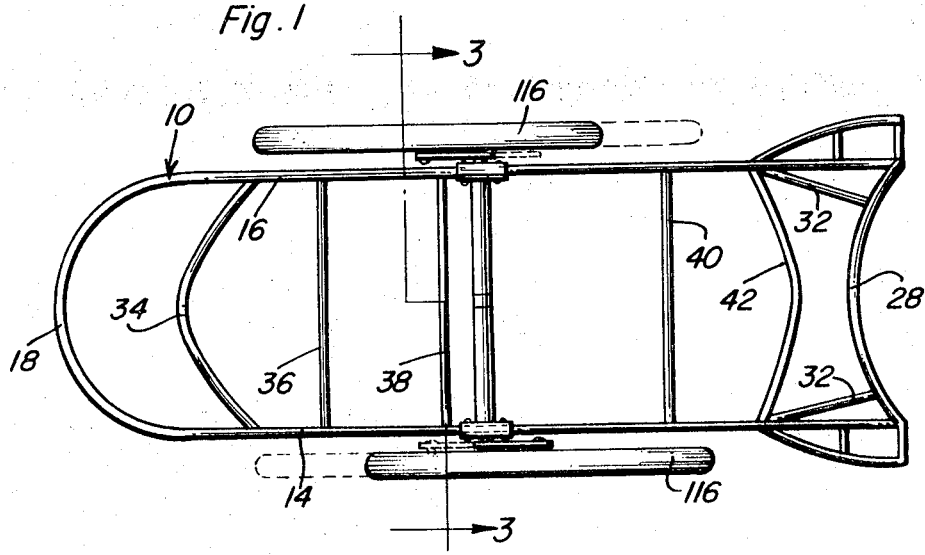
FIG. 1 is a top plan view of the vehicle of the instant invention.

Referring now more specifically to the drawings, the numeral 10 generally designates the pack vehicle of the instant invention. The vehicle 10 includes a body referred to in general by the reference numeral 12 and the body may be seen to include a pair of upper longitudinal frame members 14 and 16 extending along opposite sides of the body 12 and interconnected at their forward ends by means of a rearwardly opening integral U-shaped portion 18. The body 12 further includes a pair of opposite side lower longitudinal members 20 and 22 including upwardly inclined forward end portions 22 secured at their upper ends to the forward ends of the longitudinal members 14 and 16. Also, the rear ends of the lower longitudinal members 20 and 22 include rearwardly and upwardly inclined end portions 26 and the upper ends of the end portions 26 are interconnected by means of a downwardly opening and forwardly and upwardly inclined inverted U-shaped connecting member 28 braced relative to the upper longitudinal members 14 and 16 as well as a pair of opposite side longitudinally extending intermediate members 30 by means of a pair of inclined braces 32. The opposite side intermediate members have their forward ends secured to the mid-portions of the upwardly inclined forward end portions 24 of the lower longitudinal members 20 and 22 and the rear ends of the intermediate members 30 are connected to the mid-portions of the end portions 26 of the lower opposite side longitudinal members 20 and 22. Also, a plurality of longitudinally spaced V-shaped members 34, 36, 38, 40 and 42 are secured between corresponding longitudinally spaced points of the longitudinal members 20 and 22 so as to define an upwardly opening cradle between the opposite side portions of the body 12 defined by each set of upper, lower and intermediate longitudinal members.

A pair of depending journal-defining channel members 44 are carried by the mid-portions of the longitudinal members 20 and 22 and the lower end portions of the channel members 44 have aligned horizontal transverse bores 46 formed therethrough. In addition, each channel member lower end portion has an annular reinforcing member 48 secured thereto by welding concentric with the corresponding bore 46 and the outer race 50 of a bearing assembly referred to in general by the reference numeral 52 is secured in each annular member 48, each bearing assembly 52 including an inner race 54.

An axle assembly is provided and generally referred to by the reference numeral 58. The axle assembly 58 includes an elongated horizontal transverse axle member 60 having a first pair of inner opposite end diametrically reduced portions 62 defining endwise outwardly facing shoulders 64 and a second pair of smaller diametrically reduced end portions 66 defining a pair of annular shoulders 68, the terminal ends of the diametrically reduced end portions 66 being externally threaded as at 70.

A center sleeve 72 is secured in position on the center of the shaft or axle member 60 by means of a setscrew 74 and the sleeve 72 includes diametrically reduced opposite ends 76 and its annular end faces are provided with a pair of corresponding small diameter longitudinal bores 78. Also, a pair of opposite end annular collars 80 including circumferentially spaced bores 82 and a pair of small diameter longitudinal bores 84 corresponding to the bores 78 are disposed on the opposite end portions of the axle member 60 just inwardly of the diametrically reduced portions 62.

A pair of opposite side sleeves 86 including remote end radial bores 88 registrable with the bores 82 are provided and a pair of elongated torsion springs 90 are telescoped over the opposite ends of the axle member 60 with the sleeves 86 being telescoped over the springs 90. The springs 90 include longitudinally extending angulated end portions 92 and 94 and the end portions 94 are keyed in the bores 78 while the end portions 92 are keyed in the bores 84 and the smaller diameter end portions of the collars 80 are tightly secured in the remote ends of the sleeves 86 with the bores 82 aligned with the bores 88 while the adjacent ends of the sleeves 86 are telescoped over and rotatable relative to the diametrically reduced ends 76 of the center sleeve 72 carried by the axle member 60. The inner races 54 of the bearing assemblies 52 are snugly received on the diametrically reduced portions 62 of the axle member 60 and a pair of washers 96 are disposed on the diametrically reduced end portions 66 immediately outwardly of the inner races 54 of the bearing assemblies 52.

The front and rear ends of a pair of oppositely directed crank arms displaced 180° relative to each other are keyed on the end portions 66 of the axle member 60 outwardly of the washers 96 and secured thereon by means of retaining washers 98 and threaded nuts 100. A pair of stub axle pins or bolts 102 are carried by the free ends of the crank arms 104 and have ground-engaging support wheels 106 journaled therefrom. Also, a pair of threaded index pins 108 are supported from the lower ends of the angle members 44 and receivable in a selected pair of the corresponding bores 82 and 88.

The end portions 92 and 94 may be secured in the bores 84 and 78 in any convenient manner and the tension of the torsion springs 90 may be adjusted by backing out the index pins 108 and rotating the sleeves 86 and thus the collars 80 to increase or decrease the tension of the springs 90.

Figure 2:
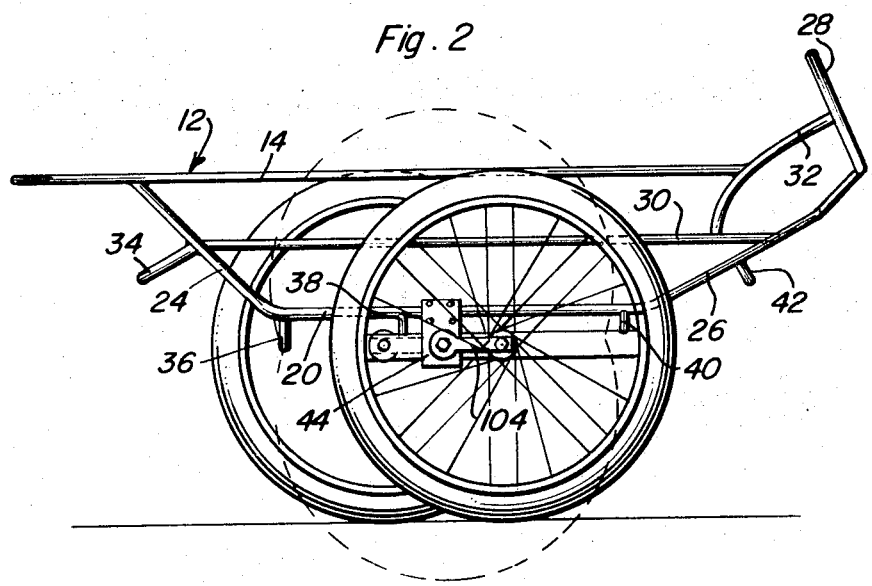
FIG. 2 is a side elevational view of the vehicle with alternate positions of the opposite side wheels thereof illustrated in phantom lines.
Figure 4:
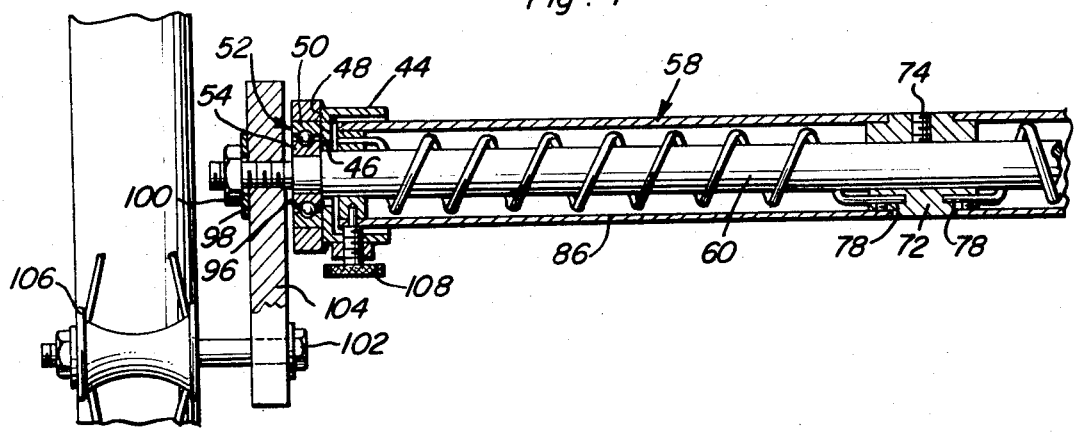
FIG. 4 is an enlarged fragmentary horizontal sectional view taken substantially upon the plane indicated by the section line 4—4 of FIG. 3.
Figure 3:
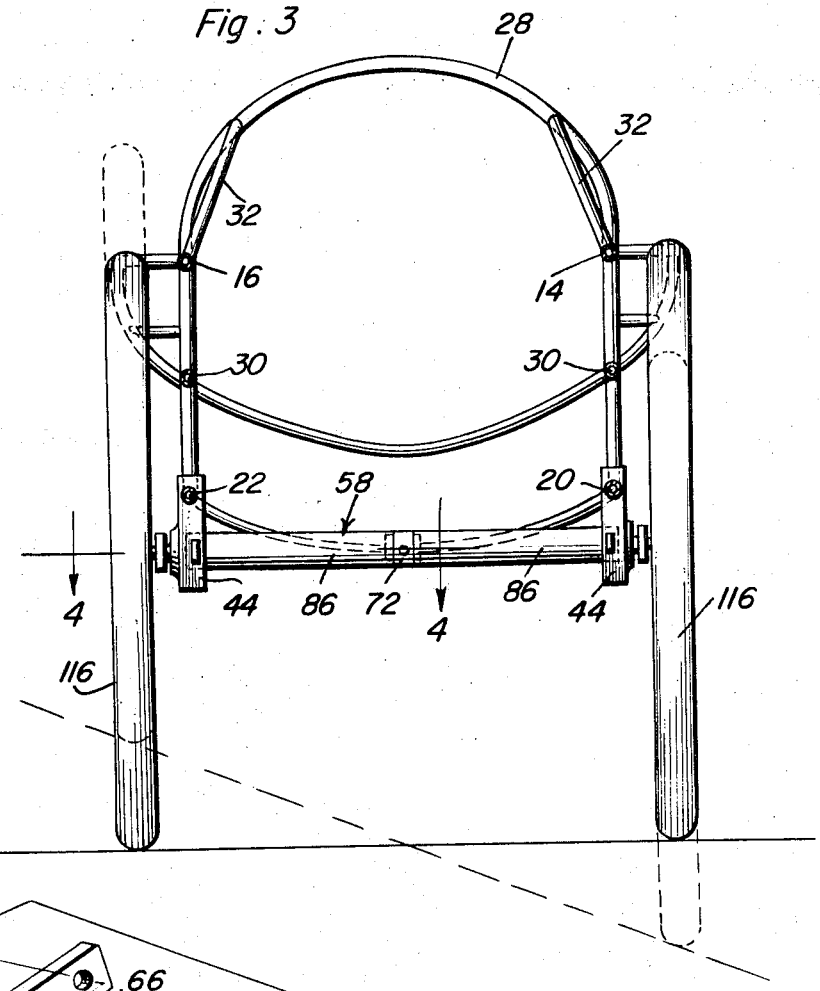
FIG. 3 is an enlarged transverse vertical sectional view taken substantially upon the plane indicated by the section line 3—3 of FIG. 1 and with alternate vertically shifted positions of the opposite side wheels of the vehicle illustrated in phantom lines.
Figure 5:
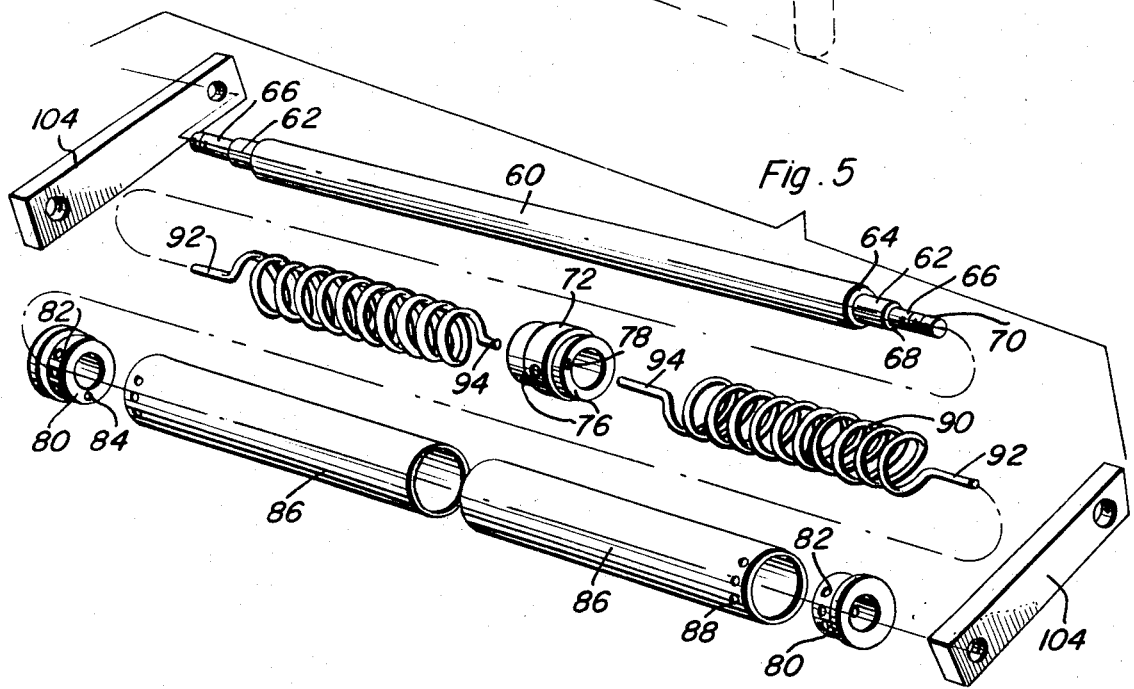
FIG. 5 is an exploded perspective view of the axle and crank arm assembly of the vehicle.

In operation, the springs 90 may be initially adjusted in the manner set forth above so as to be substantially equally tensioned. When this is accomplished, the pack vehicle 10, which has its longitudinal center of gravity disposed between vertical transverse planes containing the stub axles 102, will support itself as illustrated in FIGS. 2 and 3 of the drawings. The connecting member 28 is adapted to be engaged by the chest of a person pushing the vehicle 10 from the rear and the U-shaped portion 18 at the forward end of the vehicle 10 may be grasped by a second person pulling the vehicle 10, if desired. Further, means may be provided for driving the wheels 116.

The load to be carried may be placed within the body 12 and the vehicle 10 may then be used to trasport the load being supported over rough terrain. In the event the lower peripheral portion of one of the wheels 116 encounters an upwardly projecting obstacle, that wheel 116 will swing upwarding while the other wheel swings downwardly in order to enable the vehicle 10 to move past the obstacle. Of course, the axle assembly 58, and thus the body 12, will be elevated approximately one half the height of the obstacle over which one of the wheels 116 moves inasmuch as upward movement of the wheel 116 contacting the obstacle causes like downward movement of the opposite wheel 116. Therefore, only one half the effort is required to move the vehicle 10 over an obstacle encountered by one of the wheels 116. Of course, if the obstacle encountered comprises a horizontally elongated obstacle, the vehicle 10 is moved across or over the obstacle at an oblique angle so as to first move one wheel 116 over the obstacle and then the other wheel 116.

If an extremely wide slope is encountered and it is desired to traverse this slope, the tension of one of the springs 90 may be adjusted so that the vehicle 10 will assume a position on the slope with the body 12 in a substantially horizontally disposed position and the downhill wheel 116 disposed at a lower elevation than the uphill wheel 116. Of course, the tension of the springs 90 may be adjusted by backing out either one or both of the index pins 108, turning the sleeves 86 and thus the collars 80 to obtain the desired tensioning of the springs 90 and then re-inserting the indexing pins 108 to retain the adjusted positions of the sleeves 86 and collars 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A vehicle body including front and rear ends, a pair of crank arms journaled from opposite sides of said body for oscillation in unison about horizontal transverse axes, one of said crank arms projecting forwardly from the corresponding axis and the other of said crank arms projecting rearwardly from the corresponding axis, a pair of ground-engaging support assemblies operatively carried by the free end portions of said crank arms, and opposing spring means connected between said crank arms and said body yieldingly biasing and crank arms against angular displacement in both directions of rotation away from rest positions thereof with said crank arms horizontally disposed.

2. The combination of claim 1 wherein said ground-engaging support assemblies comprise wheels journaled from the free end portions of said crank arms.

3. The combination of claim 1 wherein said spring means includes means for adjusting the tension thereof whereby the rest positions toward which said crank arms are yieldingly biased may be angularly adjusted.

4. The combination of claim 1 including an elongated horizontal transverse axle member journaled from opposite side portions of said body, said crank arms being carried by the opposite ends of said axle member for angular displacement therewith, said spring means being operatively connected between said body and said axle member.

5. The combination of claim 4 wherein said spring means comprises a pair of helical torsion springs telescoped over the opposite end portions of said axle member with the adjacent ends of said springs keyed to said axle member and the remote ends of said springs releasably secured in stationary positions relative to said body.

6. The combination of claim 5 including a pair of axially spaced sleeves telescoped over the opposite ends of said axle member and said springs, the adjacent ends of said sleeves being journaled from said axle member, the remote ends of said springs being keyed to the remote ends of said sleeves, and means carried by said body and operative to releasably retain said sleeves in adjusted rotated positions relative to said body.

7. The combination of claim 1 wherein said body comprises an upwardly opening open framework in which a load may be cradled.

8. A vehicle body including front and rear ends and opposite sides, a pair of ground-engaging support assemblies supported from opposite sides of said body for inverse vertical movement relative to said body, and opposing spring means connected between said ground-engaging support assemblies and said body yieldingly biasing said ground-engaging support assemblies toward rest positions intermediate their upper and lower limits of movement.

9. The combination of claim 8 wherein said spring means includes means for adjusting the rest positions toward which said ground-engaging support assemblies are urged.

10. The combination of claim 8 wherein said opposite side ground-engaging support assemblies are spaced on opposite sides of a vertical transverse plane extending through said body so as to be spaced longitudinally of the latter.

11. The combination of claim 10 wherein the longitudinal center of gravity of said body is contained in said plane.

* * * * *